United States Patent
Griffen

(10) Patent No.: US 10,320,262 B2
(45) Date of Patent: Jun. 11, 2019

(54) AIR COOLED STARTER-GENERATOR

(71) Applicant: BorgWarner Inc., Auburn Hills, MI (US)

(72) Inventor: Matthew T. Griffen, Wixom, MI (US)

(73) Assignee: BorgWarner Inc., Auburn Hills, MI (US)

( * ) Notice: Subject to any disclaimer, the term of this patent is extended or adjusted under 35 U.S.C. 154(b) by 442 days.

(21) Appl. No.: 15/299,539

(22) Filed: Oct. 21, 2016

(65) Prior Publication Data

US 2018/0115216 A1  Apr. 26, 2018

(51) Int. Cl.
| | |
|---|---|
| H02K 5/22 | (2006.01) |
| H02K 5/20 | (2006.01) |
| H02K 9/06 | (2006.01) |
| H02K 11/00 | (2016.01) |
| H02K 11/33 | (2016.01) |
| H02K 7/00 | (2006.01) |
| H02K 7/08 | (2006.01) |
| H02K 7/10 | (2006.01) |
| H02K 7/18 | (2006.01) |
| H02K 9/22 | (2006.01) |

(52) U.S. Cl.
CPC ............... *H02K 7/006* (2013.01); *H02K 5/20* (2013.01); *H02K 5/225* (2013.01); *H02K 7/083* (2013.01); *H02K 7/1008* (2013.01); *H02K 7/1815* (2013.01); *H02K 9/06* (2013.01); *H02K 11/0094* (2013.01); *H02K 11/33* (2016.01); *H02K 9/22* (2013.01)

(58) Field of Classification Search
CPC .... H02K 11/30; H02K 11/33; H02K 9/02–04; H02K 9/06; H02K 5/20; H02K 5/22; H02K 5/225
USPC ...................................... 310/62–64
See application file for complete search history.

(56) References Cited

U.S. PATENT DOCUMENTS

| | | | |
|---|---|---|---|
| 6,109,122 A | 8/2000 | Bori et al. | |
| 6,396,161 B1 | 5/2002 | Crecelius et al. | |
| 6,425,839 B1* | 7/2002 | Koelle | F02N 11/04 |
| | | | 180/65.235 |
| 6,914,344 B2 | 7/2005 | Franchet et al. | |
| 7,122,923 B2 | 10/2006 | Lafontaine et al. | |
| 7,224,145 B2 | 5/2007 | Pierret et al. | |
| 7,327,123 B2 | 2/2008 | Faberman et al. | |
| 7,417,344 B2* | 8/2008 | Bradfield | H02K 5/1732 |
| | | | 310/90 |
| 7,642,690 B2* | 1/2010 | Maekawa | H02K 5/225 |
| | | | 310/112 |
| 7,692,341 B2 | 4/2010 | Lafontaine et al. | |

(Continued)

*Primary Examiner* — Jeremy A Luks
(74) *Attorney, Agent, or Firm* — Howard & Howard Attorneys PLLC

(57) ABSTRACT

A starter-generator for a vehicle includes a housing, an electric motor-generator, a structural electronic substrate board, a printed circuit board and a fan. The electric motor-generator has a rotor disposed in the housing, a shaft fixed to the rotor, and a stator fixed relative to the housing. The structural electronic substrate board includes a metal base plate defining a first housing closure at a first end of the housing with the shaft extending therethrough. The printed circuit board is inside the housing on a side of the rotor opposite the structural electronic substrate board. The fan is fixed to the shaft between the rotor and the structural electronic substrate board.

13 Claims, 3 Drawing Sheets

(56) References Cited

U.S. PATENT DOCUMENTS

| | | | |
|---|---|---|---|
| 7,696,659 B2* | 4/2010 | Umeda | H02K 19/36 |
| | | | 310/68 D |
| 7,768,166 B2 | 8/2010 | Lafontaine et al. | |
| 8,207,642 B2 | 6/2012 | Lafontaine et al. | |
| 8,253,287 B2* | 8/2012 | Isoda | H02K 5/225 |
| | | | 310/64 |
| 9,413,207 B2* | 8/2016 | Akiyoshi | H02K 9/06 |
| 9,484,787 B2* | 11/2016 | Dugue | H02K 5/20 |
| 9,577,495 B2* | 2/2017 | Fukase | H02K 9/28 |
| 2013/0207490 A1 | 8/2013 | Spearman et al. | |
| 2015/0364957 A1* | 12/2015 | Shendi | H02K 21/044 |
| | | | 310/62 |
| 2016/0197535 A1* | 7/2016 | De Filippis | H02K 1/276 |
| | | | 310/43 |
| 2016/0308410 A1* | 10/2016 | Meyer | H02K 1/243 |
| 2017/0346366 A1* | 11/2017 | Leli | H02K 9/04 |

\* cited by examiner

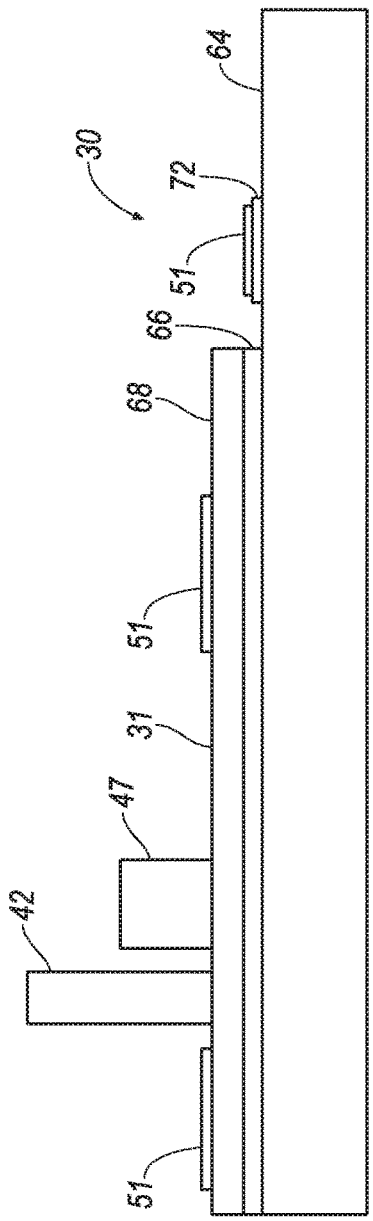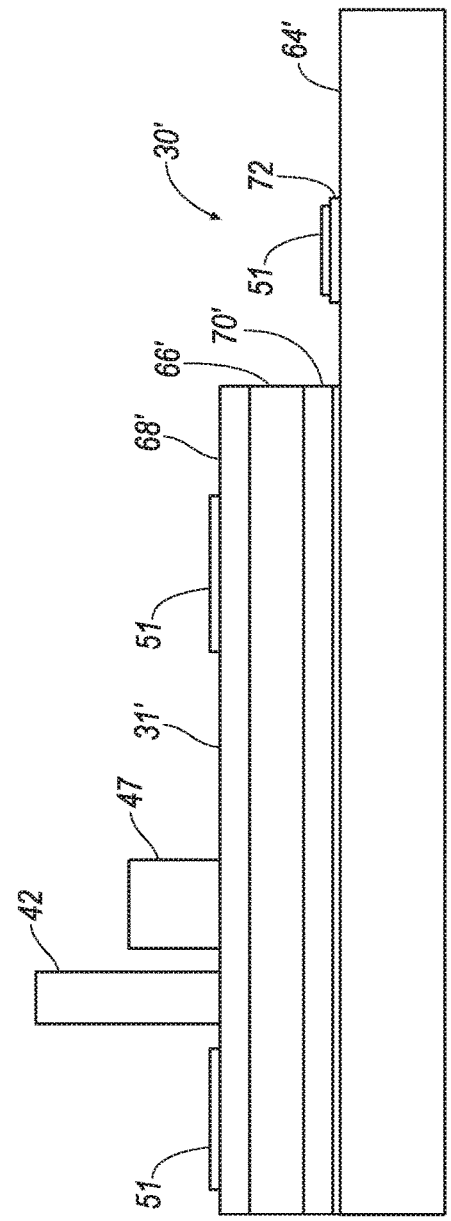

AIR COOLED STARTER-GENERATOR

BACKGROUND

Combined starter-generators are known to have associated electronics components fixed to an exterior of a starter generator housing. Such an arrangement may make the starter-generator challenging to cool and bulky compared to a conventional generator.

BRIEF DESCRIPTION OF THE DRAWINGS

FIG. 3 is a schematic side view of an example structural electronic substrate board of the starter-generator of FIGS. 1 and 2.

FIG. 4 is a schematic side view of an alternative example structural electronic substrate board of the starter-generator of FIGS. 1 and 2.

DETAILED DESCRIPTION

Introduction

A starter-generator for a vehicle includes a housing, an electric motor-generator, a structural electronic substrate board, a printed circuit board and a fan. The electric motor-generator has a rotor disposed in the housing, a shaft fixed to the rotor, and a stator fixed relative to the housing. The structural electronic substrate board includes a metal base plate defining a first housing closure at a first end of the housing with the shaft extending therethrough. The printed circuit board is inside the housing on a side of the rotor opposite the structural electronic substrate board. The fan is fixed to the shaft between the rotor and the structural electronic substrate board.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. In the Figures, like numerals indicate like parts throughout the several views.

Exemplary System Elements

Figure 1:
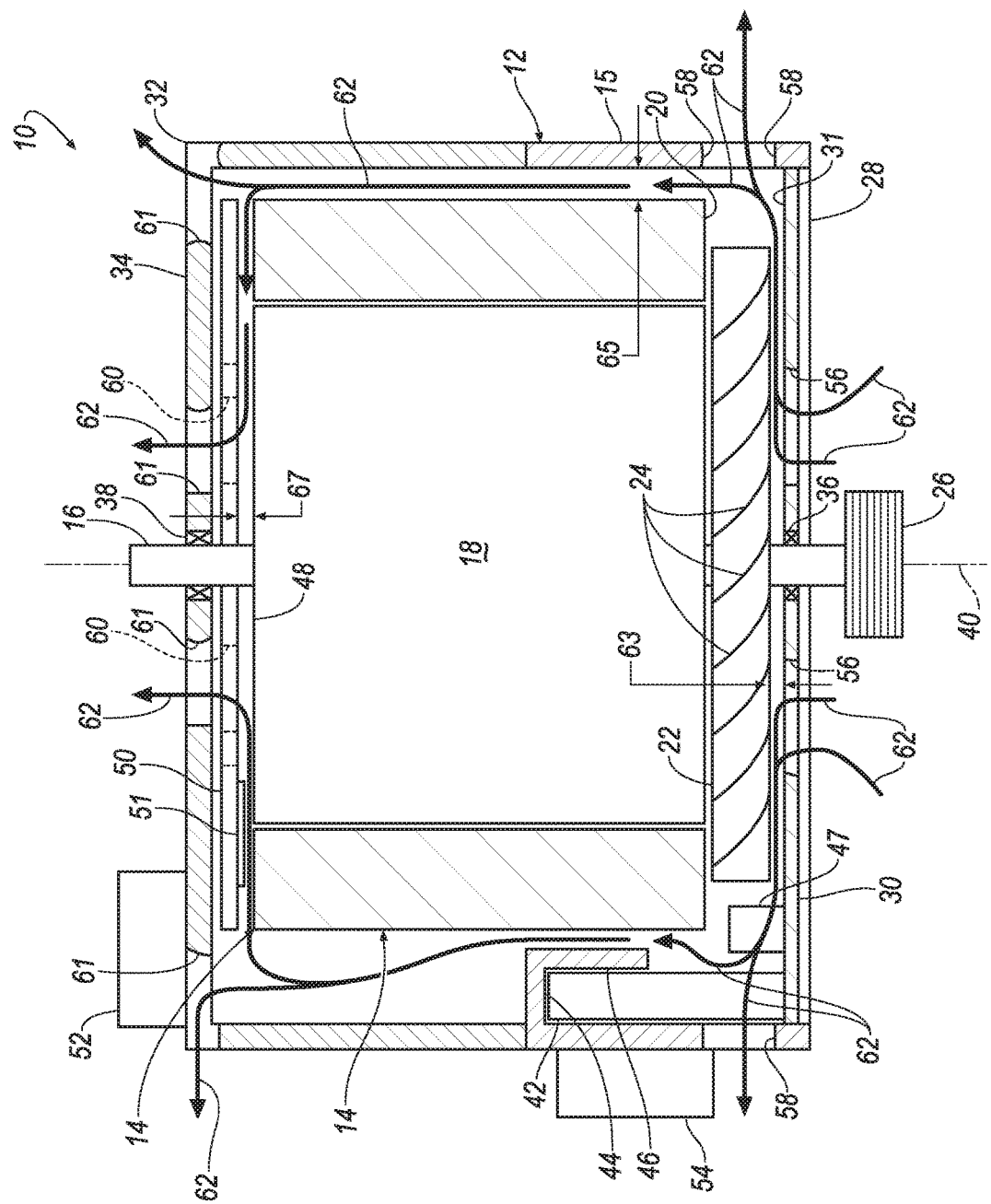
FIG. 1 is a schematic representation of an example starter-generator having a rotor and a stator.

FIG. 1 shows an air-cooled starter-generator 10 schematically. Starter-generator 10 includes a housing 12, shown in section. For purposes of this disclosure, the term "generator" is descriptive of both generators and alternators. A motor-generator 14 is disposed within a center portion 15 of housing 12. Center portion 15 may be formed of cast aluminum.

Motor-generator 14 includes a shaft 16 and a rotor 18 fixed to shaft 16. A stator 20 is fixed to center portion 15 of housing 12. While exemplary stator 20 is illustrated as disposed within housing 12, stator 20 may comprise part of housing 12. Stator 20 may include stator windings (not shown). Stator 20 is shown sectioned through a core to make rotor 18 visible. Rotor 18 and shaft 16 are rotatable relative to stator 20 and housing 12. Rotor 18 may include rotor windings (not shown).

Figure 2:
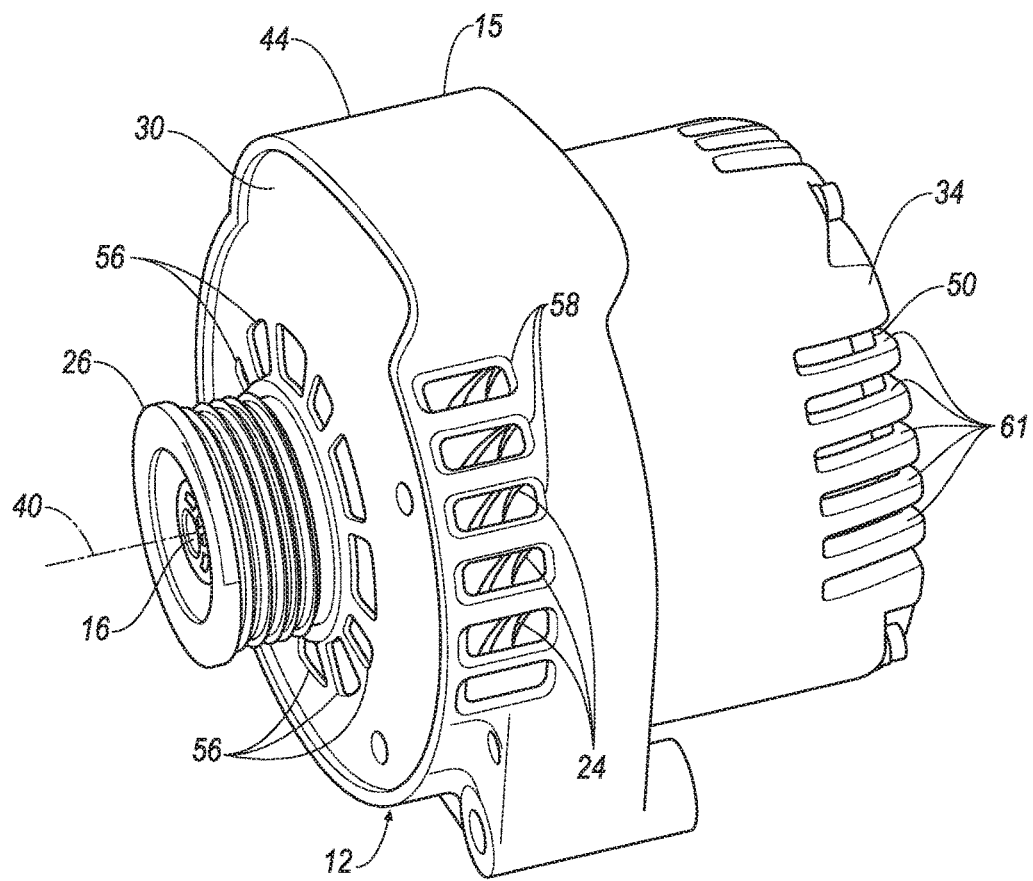
FIG. 2 is a perspective representation of the starter-generator of FIG. 1.

A fan 22 is disposed over shaft 16 within housing 12 on a first side of rotor 18. Fan 22 may be fixed to shaft 16 for rotation therewith. Fan 22 includes a plurality of fan blades 24. A pulley 26 is disposed on shaft 16 on the same side of rotor 18 as fan 22, but outside of housing 12. An exemplary pulley 26 is fixed to shaft 16. The illustrated pulley 26, best shown in FIG. 2, is suited for use with a serpentine belt. Pulley 26 may alternatively be configured for use with other types of belts including v-belts and toothed belts. Yet alternatively, pulley 26 may have teeth suited for use with a chain.

A first end 28 of housing 12, on the first side of rotor 18, has a first closure defined by an exemplary structural electronic substrate board 30, illustrated in more detail in FIG. 3. Structural electronic substrate board 30 may have some commonality with an insulated metal substrate ("IMS") board. Board 30 includes a structural element in the form of a metal base plate 64. Metal base plate 64 may have the properties of a heat sink. Base plate 64 also serves as a closure structure for the first end 28 of housing 12. Base plate 64 may be formed of aluminum.

An interior side 31 of board 30 faces an interior of housing 12. Interior side 31 includes a dielectric insulating layer 66, e.g. an epoxy layer, over the base plate. The electrically insulating layer 66 may be thermally conductive. An electrically conductive layer 68 also forms part of the interior side 31 and is disposed over the insulating layer 66, opposite base plate 64. Conductive layer 68 may be formed of copper, and may be chemically or otherwise etched or otherwise configured to provide a circuit. Electronic components, including power electronics components, may be soldered or otherwise electrically connected and mechanically fixed to conductive layer 68.

A structural electronic substrate board 30' of an alternative exemplary construction is illustrated in FIG. 4. Board 30' may be in the form of a direct bonded copper ("DBC") substrate board that is alternatively fixed to or incorporates a metal base plate 64'. DBC substrate boards are known and are alternatively referred to as direct copper bonding ("DCB") substrate boards. Metal base plate 64' serves as a structural element, more specifically as a closure structure for the first end of housing 12. Metal base plate 64' may have the properties of a heat sink. Base plate 64' may be formed of aluminum.

An interior side 31' of board 30' faces an interior of housing 12. Interior side 31' includes a dielectric insulating layer 66' that may be in the form of a ceramic material. The electrically insulating layer 66' may be thermally conductive. An exemplary ceramic material is aluminum oxide, also called alumina. A first electrically conductive layer 68' is disposed on an interior side of the insulating layer 66', opposite base plate 64'. First conductive layer 68' may be formed of copper, and may be chemically or otherwise etched or otherwise configured to provide a circuit. A second conductive layer 70', an exemplary material for layer 70' being copper, may be fixed to a second side of insulating layer 66', opposite first conductive layer 68', and against plate 64'. Electronic components, including power electronics components, may be soldered or otherwise electrically connected and mechanically fixed to first conductive layer 68'. Electrically insulating layer 66' may be thermally conductive.

Housing 12 has a second end 32 defined by an end cap 34. End cap 34 provides a second closure at second end 32. Alternatively, second end 32 may be formed integral with center portion 15. End cap 34 may be formed of any material providing suitable strength and weight properties including, by way of example, sheet metal, aluminum, plastic, and reinforced composite materials.

A first shaft support bearing 36 may be fixed to structural electronic substrate board 30, 30'. A second shaft support bearing 38 may be fixed to end cap 34. Bearings 36 and 38 may include any suitable friction-reducing mechanism, including bushings, bearings and needle roller bearings. Bearings 36 and 38, together with shaft 16, define an axis of rotation 40 of shaft 16 that extends from first end 28 and second end 32. While shaft 16 is illustrated in FIG. 1 as extending beyond end cap 34, shaft 16 may alternatively terminate within housing 12.

Board 30, 30' has power electronics components fixed thereto, which may include at least one capacitor 42. Capacitors 42 may be disposed in a capacitor receiving pocket 44 of housing 12. Capacitors 42 may be sized to provide sufficient energy storage to power cranking or rotation of an internal combustion engine by motor-generator 14. Pocket 44 may be defined by a pocket wall 46 formed of aluminum as part of housing 12. Board 30 may also include other electronic components, e.g., a voltage transformer 47.

Structural electronic substrate boards 30 and 30' may also include discrete electronic components fixed directly to the metal base plate 64, 64'. While mechanically fixed to base plate 64, 64', the electronic components may be electrically insulated from base plate 64, 64'. Such components may be connected to other electronic components either directly by wires (not shown), or via the circuit formed in layer 68, 68' by conductive wires (not shown). Exemplary electronic components include integrated circuits 51, including bare or naked dies, capacitors 42, and transformers 47. FIGS. 3 and 4 show an integrated circuit 51 may be fixed to a discrete, dielectric heat spreader or heat sink 72 that is in turn fixed to the metal base plate 64, 64'.

A position sensor for detecting a rotary position of shaft 16 may be disposed at the second end 32 of housing 12. A printed circuit board ("PCB") 50 that includes control electronics is also disposed within housing 12 and may also be disposed at second end 32. A common construction of PCBs is to form a main substrate of fiber-reinforced epoxy. An exemplary fiber material is glass. A conductive layer of an electrically conductive material, e.g. copper, is placed on the substrate. Control electronics fixed to printed circuit board 50 may include one or more integrated circuits 51. As the substrate material of the PCB 50 is less thermally conductive than the substrate material of the structural electronic substrate board 30, electrical components selected for mounting on board 30, typically generate less heat under normal operating conditions than electronics chosen for mounting to structural electronic substrate board 30. Conversely, the electronic components chosen for mounting to structural electronic substrate board 30 collectively develop more heat than the electronic components fixed to PCB 50 under normal operating conditions. Control electronics and data management components such as low power integrated circuits are an example of components suited for mounting to board 50.

The structural electronic substrate board 30, 30', together with the electronic components mounted thereon may be referred to herein as a first electronics assembly. The first electronics assembly may also be referred to herein as a power circuit assembly. The PCB 50, together with the electronic components mounted thereon may be referred to herein as a second electronics assembly. The second electronics assembly may also be referred to herein as a data circuit assembly. Collectively, the first electronics assembly and the second electronics assembly may be called the electronics system.

Terminals are provided on an exterior of starter-generator 10 to allow electrical connections, the electrical connections allowing communication of electrical power and electrical control signals to and from starter-generator 10. A first, low voltage terminal 52 may be configured to communicate 10-14 volts between starter-generator 10 and a first external power source such as a 12 volt battery. Discrete batteries of lower voltage ratings arranged in series may be identified as a 12 volt battery.

A second, high voltage terminal 54 may be configured to communicate 46-50 volts between starter-generator and a second external power source such as a 48 volt battery. Discrete batteries of lower voltage ratings arranged in series may be identified as a 48 volt battery.

Air flow apertures are provided in the components. Structural electronic substrate board 30 includes a plurality of structural electronic substrate board vent apertures 56. Apertures 56 may be within an outer diameter of fan 22. Housing vent apertures 58 are placed in the walls of housing 12. Apertures 58 are distributed around housing 12 on its side wall and through end cap 34. PCB 50 may also have a plurality of vent apertures 60 therethrough. Vent apertures 60 may be aligned with apertures 58 in end cap 34.

A combination of the rotation of fan 22, a shape of the fan blades, 24, the size, shape and location of apertures 56, 58, 60, and the spacing of components within housing 12 contribute to a definition of an air-flow path 62 through housing 12.

Air flow-path 62 includes an axial first gap 63 between fan 22 and structural electronic substrate board 30 with the electrical components mounted thereon. Gap 63 is in substantial radial alignment with apertures 58, facilitating a flow of air across board 30.

Air-flow path 62 may extend axially past stator 20 toward the second end 32 via a second gap 65 between housing 12 and stator 20. Path 62 may further include an axial third gap 67 between stator 20 and PCB 50.

Operation

Responsive to commands from a controller, such as a vehicle electronic control unit ("ECU") (not shown), starter-generator 10 operates in one of a starter mode of operation and a generator mode of operation.

In either mode of operation, heat is generated by components on each of structural electronic substrate board 30, 30' and PCB 50, with relatively more heat being generated by the components on structural electronic substrate board 30, 30'. Heat is transferred from components of structural electronic substrate board 30, 30' to the base plate 64, 64'. Base plate 64, 64' presents a large surface, substantially as large as a projected area of the first end 28 of housing 12. As described below, air flow across structural electronic substrate board 30, 30' cools board 30, 30' and the components thereon. A portion of the air flow across structural electronic substrate board 30, 30' travels within housing 12 to PCB 50 to cool it and the components thereon as well.

In the starter mode of operation, starter-generator 10 causes rotor 18, and with it, shaft 16, fan 22, and pulley 26 to rotate about axis 40. The rotation of fan 22 about axis 40 draws air into housing 12 through apertures 56 which is communicated to motor-generator 14 and across structural electronic substrate board 30, 30'. Air crossing structural electronic substrate board 30, 30' is heated by board 30, 30' and the components on board 30, 30'. The moving air removes heat from structural electronic substrate board 30, 30' and from the components on board 30, 30' and carries the heat in the direction of the flow path 62. The air follows air-flow path 62, with a portion of the air exiting through housing apertures 58. A remainder of air continues to follow path 62 to and through apertures 61 and 60, cooling PCB 50 and the components thereon as the air moves across board 50.

CONCLUSION

An example starter-generator has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A starter-generator for a vehicle, comprising:
   a housing;
   an electric motor-generator having
   a rotor disposed in the housing,
   a shaft fixed to the rotor; and
   a stator fixed relative to the housing;
   a structural electronic substrate board including a metal base plate defining a first housing closure at a first end of the housing with the shaft extending therethrough;
   a printed circuit board inside the housing on a side of the rotor opposite the structural electronic substrate board; and
   a fan fixed to the shaft between the rotor and the structural electronic substrate board wherein the electronic components coupled to the structural electronic substrate board include a plurality of power electronics components; and electronic components coupled to the printed circuit board include a plurality of data management components.

2. The starter-generator of claim 1, further comprising:
   a pulley disposed on the shaft outside of the first closure;
   a first bearing fixed to the structural electronic substrate board and rotatably supporting the shaft;
   a second end of the housing having a second closure; and
   a second bearing fixed to the second closure and rotatably supporting shaft,
   wherein the first bearing and the second bearing and the shaft cooperatively define an axis of rotation of the shaft and the rotor.

3. The starter-generator of claim 1, wherein under operating conditions, the electronic components coupled to the structural electronic substrate board collectively develop more heat than electronic components fixed to the printed circuit board.

4. The starter-generator of claim 1 wherein a voltage transformer is disposed on the structural electronic substrate board.

5. The starter-generator of claim 1 wherein a capacitor is disposed on the structural electronic substrate board.

6. The starter-generator of claim 5 wherein the capacitor extends axially in a direction parallel to the shaft and the housing includes a capacitor receiving pocket receiving an end of the capacitor opposite the structural electronic substrate board.

7. The starter-generator of claim 1 further comprising:
   a first voltage terminal disposed on the housing;
   a second voltage terminal disposed on the housing; and
   a voltage transformer electrically connected to the structural electronic substrate board.

8. The starter-generator of claim 7, wherein the first voltage terminal is compatible with connecting to a 12 volt battery, and the second voltage terminal is compatible with connecting to a 48 volt battery.

9. The starter-generator of claim 1, wherein an air-flow path is defined in part by a first gap between the fan and the structural electronic substrate board.

10. The starter-generator of claim 9, wherein the air-flow path is further defined by a first plurality of apertures in the structural electronic substrate board and a second plurality of apertures in the housing in substantial radial alignment with the gap.

11. The starter-generator of claim 10, wherein the air-flow path is further defined by a second gap between the stator and the housing and a third gap between the stator and the printed circuit board.

12. An air-cooled starter-generator for a vehicle, the air-cooled starter-generator comprising:
    a starter housing defining an interior about an axis, with the starter housing having a first housing end and a second housing end spaced from the first housing end along the axis and defining a plurality of apertures in the housing ends;
    an electric motor-generator disposed within the interior of the starter housing;
    a shaft partially disposed within and extending through the interior of the starter housing, with the shaft rotatably fixed to a rotor of the electric motor-generator;
    a fan blade rotatably fixed to the shaft operable to draw air into the starter housing through the apertures in the first housing end during rotation of the shaft; and
    an electronics system disposed entirely within the interior of the starter housing, the electronics system comprising,
    a first electronics assembly, and
    a second electronics assembly,
    wherein the first electronics assembly is disposed at the first housing end and the second electronic assembly is disposed at the second housing end, with the first electronics assembly and the second electronics assembly further defining the apertures operable to allow airflow to cool the first electronics assembly and the second electronics assembly, wherein the first electronics assembly is further defined as a power circuit assembly and the second electronics assembly is further defined as a data circuit assembly.

13. The air-cooled starter-generator as set forth in claim 12, wherein the electronics system further comprises at least one capacitor, and wherein the starter housing defines a receiving pocket within the interior of the starter housing, with the at least one capacitor disposed within the receiving pocket.

* * * * *